United States Patent [19]

Olson

[11] Patent Number: 4,924,159

[45] Date of Patent: May 8, 1990

[54] METHOD AND APPARATUS FOR REMOTELY REVERSING ELECTROMECHANICAL DOOR OPENERS

[76] Inventor: Ronald Olson, 3560 118th Ave., Coon Rapids, Minn. 55433

[21] Appl. No.: 369,636

[22] Filed: Jun. 21, 1989

[51] Int. Cl.[5] .............................................. G05D 3/00

[52] U.S. Cl. .................................... 318/466; 318/266; 318/286

[58] Field of Search ............... 318/255, 256, 264, 266, 318/280, 283, 284, 285, 286, 466, 467, 468, 469, 480; 49/29, 30, 31, 25, 26, 27, 28

[56] References Cited

U.S. PATENT DOCUMENTS

| | | | |
|---|---|---|---|
| 2,801,844 | 8/1957 | Cook | 49/25 |
| 3,534,499 | 10/1970 | Chaffee | 49/25 |
| 3,662,229 | 5/1972 | Graff et al. | 49/31 X |
| 3,783,556 | 1/1974 | Cook | 49/25 |
| 4,029,176 | 6/1977 | Mills | 49/25 X |
| 4,134,050 | 1/1979 | Sibalis | 49/28 X |
| 4,206,390 | 6/1980 | Jessup | 318/469 |
| 4,263,536 | 4/1981 | Lee et al. | 318/468 X |
| 4,263,746 | 4/1981 | Eller et al. | 49/28 |
| 4,274,227 | 6/1981 | Toenjes | 49/28 |
| 4,376,971 | 3/1983 | Landgraf | 49/28 |
| 4,701,684 | 10/1987 | Seidel et al. | 318/456 |

*Primary Examiner*—Bentsu Ro

*Attorney, Agent, or Firm*—William C. Flynn

[57] ABSTRACT

An obstruction sensing door reverser attachable to an existing electromechanically operated door opener having existing current carrying stop and open loops; having at least one external obstruction switch disposed in a current carrying loop communicating the presence of the obstruction to the door reverser for stopping movement of the door and further more initiating and holding an open signal on the door operator open loop for predetermined period of time to open the door.

8 Claims, 2 Drawing Sheets

METHOD AND APPARATUS FOR REMOTELY REVERSING ELECTROMECHANICAL DOOR OPENERS

BACKGROUND OF THE INVENTION

The present invention relates generally to electromechanical door openers. More particularly, the invention relates to an apparatus and method adapted for attachment to existing door openers to provide a remote "safety" reversing switch to open to door upon sensing an obstruction in the door path.

The field of electromechanical door operators covers a multitude of applications including pivoting and track mounted overhead doors, and a variety of doors, gates and the like having in common, movement on a single vertical pivot. The door openers generally consists of a motor or other similar power source which provides mode of power through a transmission to urge the door in a selected direction at a selected rate of travel suitable for its particular application. While door openers are generally safe in their operation, there is some danger of a person or an object being caught in the path of a closing door. Many door operators now available include a door reversing or opening mechanism which reverses the travel of the door or opens the door upon sensing an obstruction in the path of the closing door. Such reversers are presently required on all new garage door openers sold for residential uses. While this, over time, will provide the added safety feature to residential applications for garage door openers, it will have no effect of the commercial applications for overhead garage door operators.

There is currently no national requirement for the safety reversing feature to be included on commercial door operators. However, there is presently at least one state requiring safety reversers on commercial overhead door operators. The applicant further believes that this is the beginnings of a national trend which will ultimately require safety reversers be installed on all commercial overhead door operators. Such a requirement would include not only newly installed doors, but also the installation of a safety reverser on existing doors.

Commercial door operators are generally of quite heavy duty construction and have a very long life. The life of a door operator frequently is consistent with the life of the building and often exceeds the life of the building. Costs of replacing the existing door operators that are still functioning to provide the desirable safety reversing feature is very high, and in some cases would be prohibitive.

In light of the trend to require safer commercial door operators, there has been inventive activity in providing door operators that reverse upon sensing an obstruction in the path of a closing door. Most of this activity is directed toward producing a door operator which is reversible upon striking an obstruction and none that I am aware of is available as an attachment or addition to existing door operators to add an economical and easily installed reversing mechanism to the existing door operator.

Generally, the prior art divides into two groups, the first being door operators sensing a load increase on the drive mechanism of the door operator; the second group functioning by sensing the movement of the door and reversing the door operator upon sensing the stoppage of the movement thereof.

The first group of door reversers are exemplified in U.S. Pat. No. 3,719,005 issued Mar. 6, 1973 to Carley; U.S. Pat. No. 4,274,227 issued Jun. 24, 1981 to Toenjes; and U.S. Pat. No. 4,701,684 issued Oct. 20, 1987 to Seidel et al. These patents disclose various methods for sensing the increase in load upon the drive mechanism of the door operator while being closed and communicating that increase in load to the controller to thereby cause reversing of the direction of the door movement. Carley uses a torque switch disposed on its motor output shaft to provide such a result. Toenjes uses the movement of the drive track to actuate a switch responsive to the closing door striking an obstruction. Seidel takes a somewhat novel approach by determining the load indirectly using a temperature sensor disposed in a manner to measure the increase in temperature of the operator drive motor upon striking an obstruction and thereby causing the reversing signals to be sent responsive to the temperature rise.

The second group of door operators are exemplified by U.S. Pat. No. 4,263,746 issued Apr. 28, 1981 to Eller et al.; U.S. Pat. No. 4,376,971 issued Mar. 15, 1983 to Landgraf et al.; and U.S. Pat. No. 4,501,963 issued Feb. 26, 1985 to Parisic. In Eller, door motion is sensed by a flow sensor responsive to an auxiliary pneumatic cylinder. Parisic more directly senses the motion by placing a wheel against the inside of the moving door and generating a stream of electrical impulses therefrom. Upon the cessation of the stream of pulses the device causes a reversal of the door operator. Landgraf provides a series of sensors which are sequentially actuated by passage of the closing door. Therefrom the delay of a sequential pulse indicates an obstruction thereby causing the reversal of the door operator.

All of the above set out examples provide a variety of method and apparatus for reversing a door operator upon sensing an obstruction. They however are drawn to the inclusion of an entire door operator used exclusively on residential applications and none of which are readily adaptable for inclusion upon an existing commercial door operator.

SUMMARY OF THE INVENTION

The present invention is a door reverser adapted for attachment to existing door operators through existing wiring. The invention is a controller which receives its power from the existing door operator and provides at least one remote instruction sensing switch connected in a normally open manner along with utilization of the existing external stop and open circuits of the door operator. Upon sensing an obstruction through through the obstruction switch, the door reverser first operates to stop the travel of the door and then after a short predetermined time, energizes the door operator to open the door to its fully opened position. Thusly, upon sensing the obstruction in the path of the closing door, the door is first stopped and then returned to its fully opened position preventing or at least minimizing damage to both the door and the obstruction.

It is the principal object of the invention to provide a safety door reverser that is designed to be adaptable for use on most existing door operators.

In is an object of the invention to provide a safety door reverser which satisfies current regulations and anticipated future regulations for electromechanical doors in a commercial environment.

It is an object of the invention to provide a safety door reverser which may be installed on existing door operators with a minimum of work and requiring a minimum of skills of the installer.

It is another object of the invention to provide a safety door reverser adapted to cooperate with the existing control circuitry of most existing door operators.

It is another object of the invention to provide a safety door reverser adapted to use one or more of the multitude of currently available safety switches for sensing an obstruction.

DESCRIPTION OF THE DRAWINGS

Foregoing and other objects and advantages will become apparent from the following specifications and claims, and with reference to the appended drawings, in which:

DESCRIPTION OF THE PREFERRED EMBODIMENT

Figure 1:
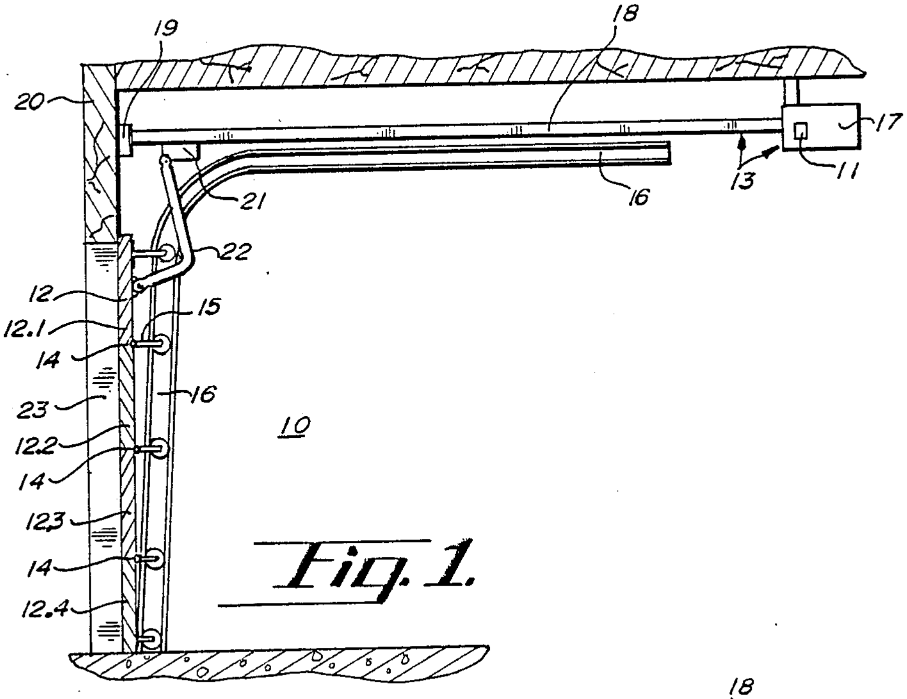
FIG. 1 is an overall side view showing the invention as it is installed on an existing door operator.

Referring first to FIG. 1, an overhead door assembly 10 is shown having the safety reverser 11 installed thereon. While the invention is shown and described as applied to an overhead multipanel door assembly, it is understood that the invention may also be used with other types of doors, such as doors or gates pivoting on a single vertical axis, gates, either pivoting or sliding, single panel overhead doors, or the like. As shown in FIG. 1, the overhead door assembly 10 consists of a door 12 and the door operator, generally 13. The door 12 as shown has multiple panels 12.1, 12.2, 12.3, 12.4 with each adjacent pair of panels connected by with hinges 13; each hinge having a carrier 14 extending inwardly from the door and movably located in a track 15.

The door operator 13 has a power unit 17 suspended above the track 16 and typically located beyond the end of the track 16. A trolley 18 extends from the power unit 17 along the track 16 terminating with an attachment bracket 19 to the interior of the building wall 20. Attached to the trolley 18 is a carrier 21 for carrying a connecting arm 22 attached to the top most door panel 12.1.

The construction of the door operator 13, in particular, its circuitry and mode of transmitting power through the trolley 18 to the carrier 21 the connecting arm 22 to the door 12 is well known in the art and may be any one of the number of commonly used methods and apparatus therein. The only limitations placed on the door operator 13 by the present invention are that it be electrically operated and be able to provide the invention with a source of 24 volt AC electrical current and have externally accessible electrical loops for stopping the door operation and opening the door.

Figure 3:
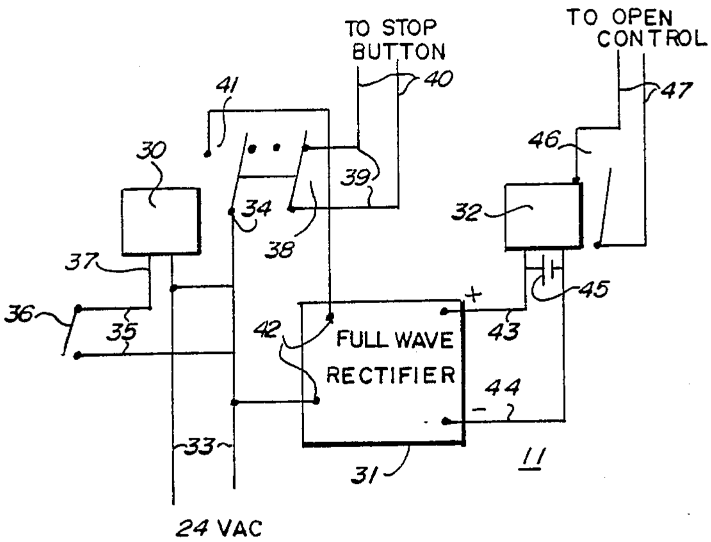
FIG. 3 is a block circuit diagram of the present invention.

The safety reverser 11, more clearly shown diagrammatically in FIG. 3, consists of a stop relay 30, a rectifier 31 and open relay 32. The stop relay 30 is a relay controlling dual circuits typically called double pole double throw (DPDT) switch. The first relay 30 is powered through its power supply lines 33 from the 24 V AC power available at the door operator 13. The one power supply line 33 is connected to the first terminal of the relay coil 34 and the second connection of the power line 33 is wired through the obstruction switch loop 35 containing the at least one, obstruction switch 36 and thence to the second terminal of the relay coil 37.

The relay first switch 38 is connected, though its normally closed terminals 39 into the external stop circuit 40 of the door operator 13. The stop relay 30 first switch 41 is connected between the normally open terminals of the stop relay 30 and the first relay coil terminal 34 to the AC input 42 of the rectifier 31. The remaining AC input terminal 42 of the rectifier 31 is connected the the obstruction switch loop 35 of the door reverser 11.

The DC plus output 43 and the DC minus output 44 of the rectifier 31 are used to control the coil of the second relay 32. A polarized capacitor 45 is disposed across the input 43, 44 of the open relay 32. The second relay terminals 46 are connected, in a normally open position, to the door open control loop 47 of the door operator 13.

The stop relay 30, as used in the invention, may be any DPDT type relay suitable for being powered by low voltage AC current and capable of switching the relatively low current carried upon its contacts. Numerous of such relays are known and available in the marketplace, and it has been found that a Dayton Electric Co. No. 5X837F or equivalent relay 30 is suitable for this application and is preferably used.

The open relay 32 may be any one of a number of readily available relays suitable for being powered by low voltage DC current and having a pair of normally open contacts suitable for switching low voltage AC current. It has been found that the Dayton Electric Co. No. 1A487F is such a relay and is preferred to be used in the invention.

The rectifier 31 may be any suitable rectifying device readily available in the marketplace such as a diode, or a full wave bridge rectifier. It is preferred however that the rectifier 31 be a full wave bridge rectifier.

The capacitor 45 is a standard electrical polarized capacitor which is readily available from numerous sources and preferably a lower tolerance (20%) capacitor that need not be rated higher than 35 V and has a capacitance in the range of 400-600 uF (microfarads) and preferably has a capacitance value of 470 uF.

The obstruction switch 36, as shown diagrammatically in FIG. 3, may be any type of a normally open switch suitable for actuation through low voltage current. The obstruction switch 36 may be a simple, normally open, push button type of switch allowing for manual actuation and reversal of the door operator 13. It is preferable, however, that at least one obstruction switch 36 be an automatically actuated switch.

Figure 2:
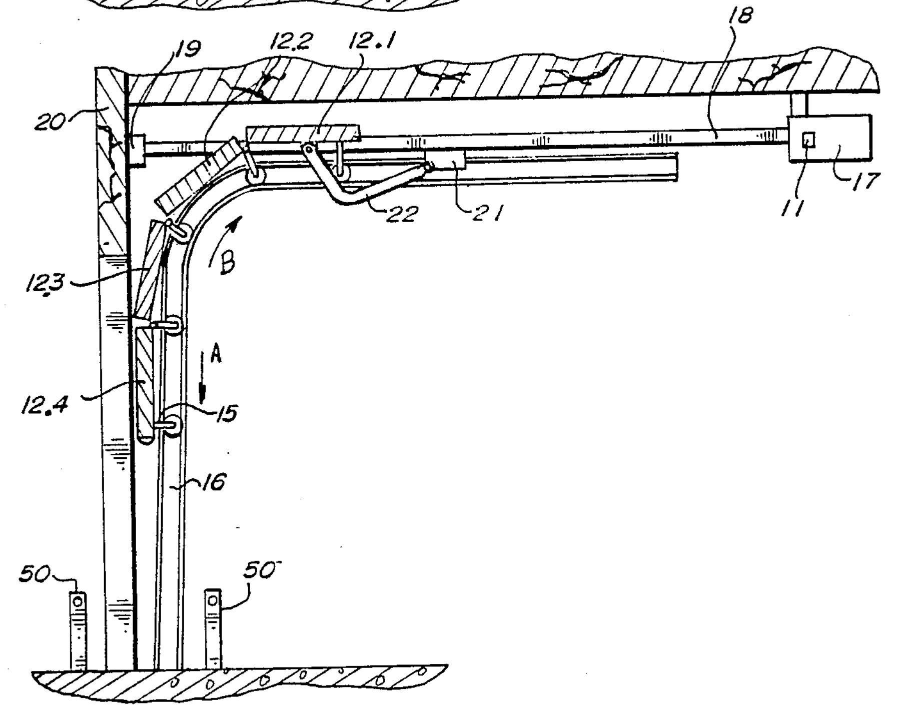
FIG. 2 is an overall view similar to FIG. 1 showing the door in a partially open position.

Many types of automatically obstruction sensing switches which would sense an obstruction in the path of a closing door are readily available in the marketplace. They include a photocell switch 50, a U-shaped astragal 51, both as shown in FIG. 2 and a floor mounted pneumatic bell cord 52 as shown in FIG. 1. These devices are well known in the art and readily available and are adaptable for providing the means for actuating the obstruction switch 36.

The photocell switch 50 may be adapted for inclusion in the obstruction switch loop 35 to provide a closed loop signal when the transmitted light beam is broken. The photocells 50 are shown located immediately to each side of the door 12 to sense the passage of an obstruction, such as a person or vehicle into the area of the door opening 23 and thus to create an obstruction signal therefrom.

Both the astragal 51 and the valve cord 52 are pneumatic in nature and each comprise an open tube sealed at the one end and having sensor located at the second end such that when the astragal 51 or the bell cord 52 is deformed by pressure the sensor is activated closing the obstruction switch 36 thereon. The astragal 51 would be actuated by the door moving in a closing direction, as indicated by the arrow A in FIG. 2 pressing down on the obstruction and deforming the astragal 51 thereby transmitting an air pulse there through for actuation of the obstruction switch 36.

The valve cord 52 is similarly actuated by deformation cause by a person stepping thereon or a vehicle passing there over and would thereby send a signal to its sensor and close the obstruction switch 36 thereon.

In its use, it is contemplated that the door reverser 11 would be attached to the existing operator 13 of a overhead door assembly 10. However, the door reverser 11 may be integrated into the manufacture of a door operator 13. The door reverser 11 is illustrated, for convenience, affixed to the door operator 13 power unit 17. It is understood however, that the reverser 11 may be installed at any location that is convenient. The door reverser 11 is first placed in a convenient location, then is connected having the power supply line 33 connected to the 24 volt AC terminals of the operator power unit 17 and the first switch terminals connected into the operator power units stop circuit 40 and the open relay 32 terminals connected into the operator power unit's open circuit 47. The obstruction switch loop 35 is then wired to contain at least one obstruction switch 36. The obstruction switch may be any one, or more, of the obstruction switches 36 described above. After installation the reverser 11 is then ready for operation.

During the normal use of the door operator 13, the reverser remains inoperative and the door 12 may be operated to close the door, as indicated by arrow A in FIG. 2 or open the door, as indicated by arrow B in FIG. 2. In open door, the power unit 17 responsive to an external command urges the carrier 21 in the selected direction along the trolley 18, which in turn moves the connecting arm 22 and hence the door 12 in the selected opening or closing direction. The door 12 continues to travel in the selected direction until reaching its limit of travel.

Only when an obstruction is sensed during the closing of the door 12 does the reverser operate. Upon sensing an obstruction, the obstruction switch 36 is closed allowing the current to flow to the stop relay 30 coils and triggering the first relay switches 38, 41 to their activated position. The first switch 38 is thusly opened opening the operator stop circuit 40 and removing power from the motive means of the operator power unit 17. Contemporaneously therewith the stop relay 30 and switches 41 are closed allowing current to flow to the rectifier 31. The DC output 43, 44 of the rectifier 31 energizes the open relay 32 while charging the capacitor 45 actuating and closing the second relay switch 48 which energized the operator open circuit 47 causing the operator power unit 17 to begin opening the door 12. When the obstruction switch 36 opens power is removed from the stop relay 30 coil terminals 34, 37 allowing the first relay 30 to revert to its relaxed state and closing the stop circuit 40 of the door operator or power unit 17. This further removes the power from the rectifier 31 and thence the open relay 32. The second relay 32 would revert to its relaxed state but for the charge held in capacitor 45 which maintains the open relay 32 in its activated state for a period of time.

It is necessary for the open relay 32 remain activated for a period of time to allow the operator power unit 17 to coast to a complete stop that it may be restarted in the opening direction. The capacitor 45 is selected to provide a suitable delay that is sufficiently short to minimize the damage caused by the closing door 12 to both the door 12 and the obstruction while being sufficiently long to allow the door operator power unit 17 to coast to a complete stop to be restarted in an opening, Arrow B, direction.

It has been found in this application that the capacitance of the capacitor 45 will vary depending on the particular application and a 470 uF capacitor provides a delay in the range of $\frac{1}{2}$ to $\frac{3}{4}$ of a second which is sufficient to allow all but the slowest door operator 17 to come to a complete stop for reversing.

When the door 12 is moving in the closing direction, arrow A, and senses an obstruction, the door 12 will, upon closing of the obstruction switch 36 first stop briefly and then restart in an opening direction, arrow B, and continue in that direction until fully opened. This action will minimize the damage to both the door 12 and any obstruction, such as a person or a vehicle which may have been inadvertently in the path of closing door 12.

In the event the door 12 is moving in an opening direction, arrow B, and the obstruction switch 36 is actuated, the door reverser will function in the same manner by first stopping the movement of the door, as described above, and then restarting the door in the opening direction as, likewise described above. Thus the inadvertent actuation of the reversing switch 36 which the door is opening will only have the effect of slightly delaying the opening of the door.

The present invention may be embodied in other specific forms without departing from the spirit or central attributes thereof, and it is therefore desired that the present embodiment be considered in all respects as illustrative and not restrictive, reference being made to the appended claims rather than the foregoing description to indicate the scope of the invention.

What is claimed:

1. A reversing apparatus for a door operator for reversing a moving door upon sensing an obstruction, comprising:

(a) an obstruction sensor;

(b) means for communicating a stop signal to the door operator responsive to the obstruction sensor;

(c) a relay activated responsively to the means for communicating the stop signal; and (d) means for providing direct current and means for releasably storing said direct current for a predetermined time to said relay to hold said relay in an activated state for producing an open signal and communicating said open signal to the door operator for the predetermined time responsive to the means for communicating the stop signal; whereby the door operator is allowed to completely stop during the predetermined time and is restarted in an opening direction.

2. The apparatus as described in claim 1 wherein the means for providing direct current comprises a diode.

3. The apparatus as described in claim 1 wherein the means for providing direct current comprises a full wave bridge rectifier.

4. The apparatus as described in claim 1 wherein the means for releasably storing said direct current a predetermined time comprises a capacitor.

5. A process for reversing a moving door operator upon sensing an obstruction comprising the steps:

(a) sensing the obstruction includes closing a current carrying loop with at least one normally open obstruction switch;

(b) communicating a stop signal to the door operator responsive to sensing the obstruction; and (c) activating a relay responsive to communication of the stop signal and holding said relay in the activated state for a predetermined time by providing direct current electricity to said relay and releasably storing said direct current electricity for said predetermined time.

6. The process as described in claim 5 wherein the step of providing direct current electricity to said relay comprises passage of current through a full wave bridge rectifier.

7. The process as described in claim 5 wherein the step of releasably storing said direct current electricity comprises storage of said direct current electricity in a capacitor.

8. A remote obstruction sensor for reversing a door operator comprising an electromechanical means for urging the door in a selected direction having a normally closed current carrying electrical stop loop and; a normally open current carrying electrical open loop, the obstruction sensor comprising:

(a) at least one normally open obstruction switch disposed in a current carrying loop external to the obstruction sensor and electrically communicating with the obstruction sensor;

(b) a normally closed stop loop switch disposed in the stop loop of the door operator, (c) a means for opening the stop loop switch responsive to the closing of one obstruction switch;

(d) a normally open open loop switch disposed in the open loop of the door operator;

(e) a direct current powered means for providing direct current for closing the open loop switch responsive to a signal communicated from the means for opening the stop loop switch; and (f) means for releasably storing said direct current for holding the open loop switch closed for a predetermined time.

* * * * *